_United States Patent Office_ 2,909,392
Patented Oct. 20, 1959

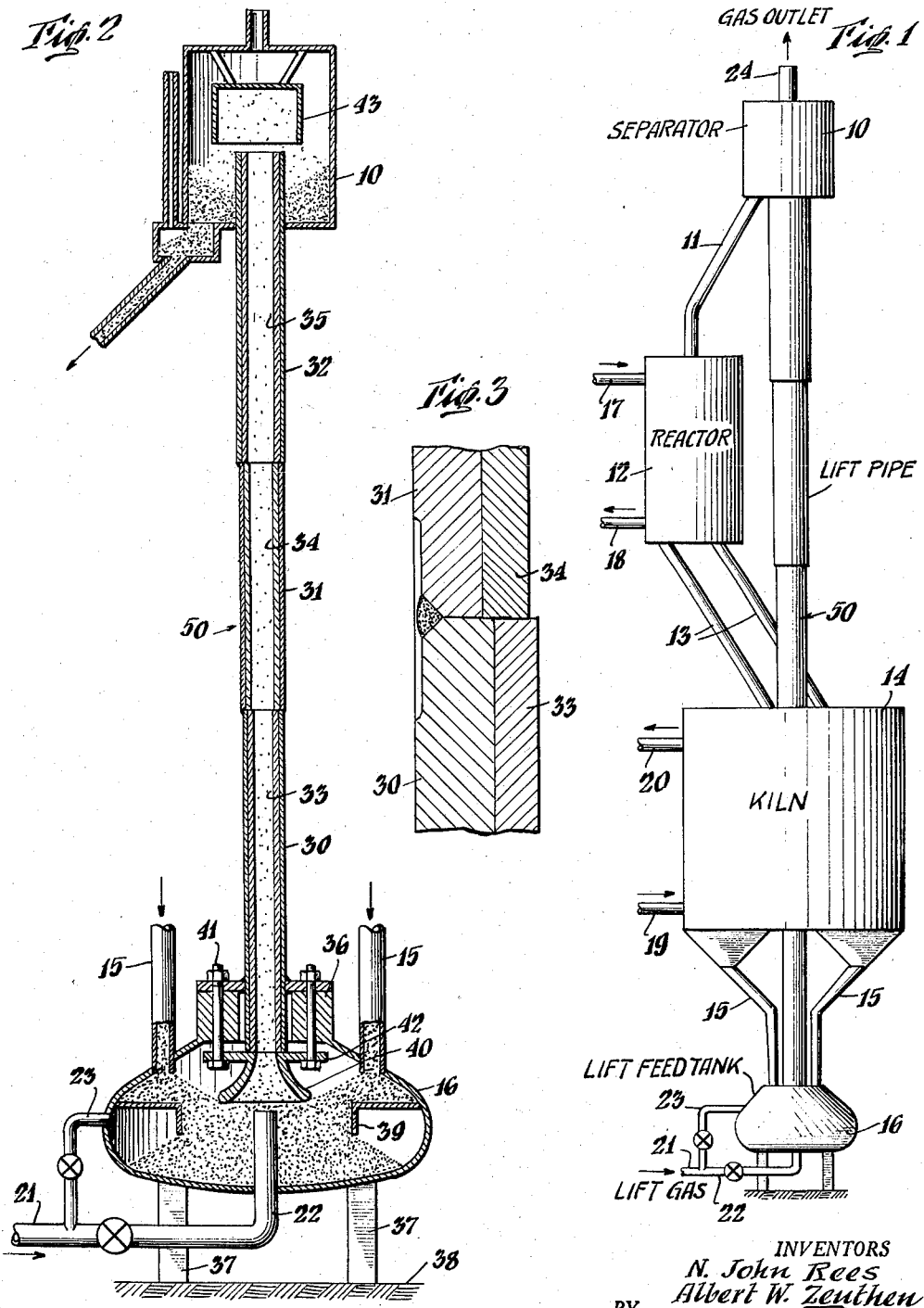

2,909,392

GAS LIFT

Norman John Rees and Albert W. Zeuthen, Bayside, N.Y., assignors to Socony Mobil Oil Company, Inc., a corporation of New York Application August 2, 1956, Serial No. 601,838

8 Claims. (Cl. 302—59)

This invention pertains to improved apparatus for upward transfer of granular contact material in cyclic systems. It particularly pertains to an improved pneumatic lift for elevating hot granular contact material or catalyst in a cyclic system for the continuous conversion of hydrocarbons, which incorporates a reaction and regeneration vessel through which the contact material is moved as part of an enclosed continuous path.

Various hydrocarbon conversion processes, such as coking, desulfurization, cracking and reforming use a granular contact material as a heat carrier, catalyst or both. In one preferred form of operation, the granular material is gravitated as a compact mass through reaction and regeneration vessels and elevated from the bottom of one vessel to the top of the other vessel by means of a pneumatic lift. The hydrocarbons are passed continuously through the reaction vessel at elevated temperature, such as 800–1000° F. for cracking reactions. During reaction a carbonaceous deposit accumulates on the catalyst. During passage of catalyst through the regeneration vessel, air is blown through the mass to burn the carbonaceous deposit from the catalyst and render it fit for re-use in the reaction vessel. The temperature may be about 1000–1300° F. in the regeneration vessel. The hot catalyst is withdrawn from the regeneration vessel and elevated without cooling, thereby supplying at least part of the heat required in the reaction vessel.

The catalyst or contact material may vary considerably in size. However, when the particles are gravitated through the contact vessel as a compact mass, the size is generally made large enough so that the gas flow through the bed is not seriously impeded. The particles may range in size from about 3–60 mesh Tyler Screen Analysis, depending upon the process involved. For example, for catalytic cracking a suitable range is about 4–10 mesh Tyler. The contact material may be a natural or treated clay, a silica or alumina gel type catalyst or an inert material, such as fused alumina, porcelain or Carborundum. These materials are abrasive and may cause severe erosion of metal, particularly when blown at high velocity against metal walls of the enclosed system.

Recently, the granular material has been elevated in these systems through a substantially vertical lift pipe by means of a rapidly flowing stream of lift gas, such as air or steam. The lift comprises generally an upwardly directed open-ended lift pipe having its upper end terminated intermediate the top and bottom of an enlarged separating vessel and its lower end terminated intermediate the top and bottom of an enlarged lift feed vessel or lift tank. The granular catalyst is gravitated from the bottom of one of the contacting vessels into the lift feed tank to form a compact bed around the lower end of the lift pipe. The lift gas is introduced into the lift feed tank to suspend the solid particles beneath the open lift pipe and sweep them upwardly through the pipe. The gas and solids are separated in the separator at the top of the lift pipe and the particles of solid catalyst are gravitated into the top of the other contacting vessel.

The lift pipe is a long continuous pipe, usually in the neighborhood of 150–250 feet tall. Because the pipe must operate at elevated temperatures, such as 900–1100° F., it is desirable that the pipe be supported in a minimum number of places to avoid temperature stresses in the metal which may result in buckling or rupture of the pipe or damage to the pipe support members. The pipe metal must be strong in tension and shear. The pipe is generally fabricated in the field from pipe sections not over 50 feet long. The metal must, therefore, be capable of making strong welds. The welds must possess the same strength characteristics as the pipe metal, high tensile and shear strength.

It has been customary in this art to produe the pipe from low carbon steel, since this metal is strong in tension and shear and easy to weld, producing a strong bond. It has been found, however, that there is some rubbing of the highly abrasive catalyst along the inner wall of the lift pipe which causes erosion of the metal, particularly in the lower portion of the pipe. The resistance of low carbon steel, particularly at high temperature, to abrasion is low enough so that these lift pipes, when used in catalytic cracking systems of the moving bed type, must be replaced at too frequent intervals. In some instances, the lift pipe may need repair or replacement in as little as three months of continuous operation. This is exceedingly expensive in both money and lost cracking capacity.

Metals which exhibit satisfactory erosion resistance are unfortunately brittle and may crack when subjected to thermal shock. Also, they are often unweldable and when weldable the welds are not sufficiently ductile and sound to make it feasible to construct commercial lift pipes out of such material.

These difficulties are overcome by this invention. A sheath is formed of pipe sections of a ductile, weldable low alloy or carbon steel. An abrasion-resistant alloy, described hereinafter, having exceptional qualities is located on the inner surface of each pipe section to provide a hard metal liner. The ends of the pipe sections are welded together to produce the continuous outer sheath of the pipe. The ends of the liner are flat and butted together. This produces a substantially continuous hard metal lining in the pipe but the ends of the liners are not welded together.

The object of this invention is to produce an improved pneumatic lift for use in cyclic conversion systems having high wear-resisting qualities.

This and other objects of the invention will be disclosed in the detailed discussion of the invention which follows:

Figure 1 shows diagrammatically a hydrocarbon conversion system.

Figure 2 shows in vertical section a pneumatic lift for elevating granular contact material.

Figure 3 shows in vertical section a section of the pneumatic lift pipe illustrating the formation of the lift pipe from pipe sections.

Figure 4:
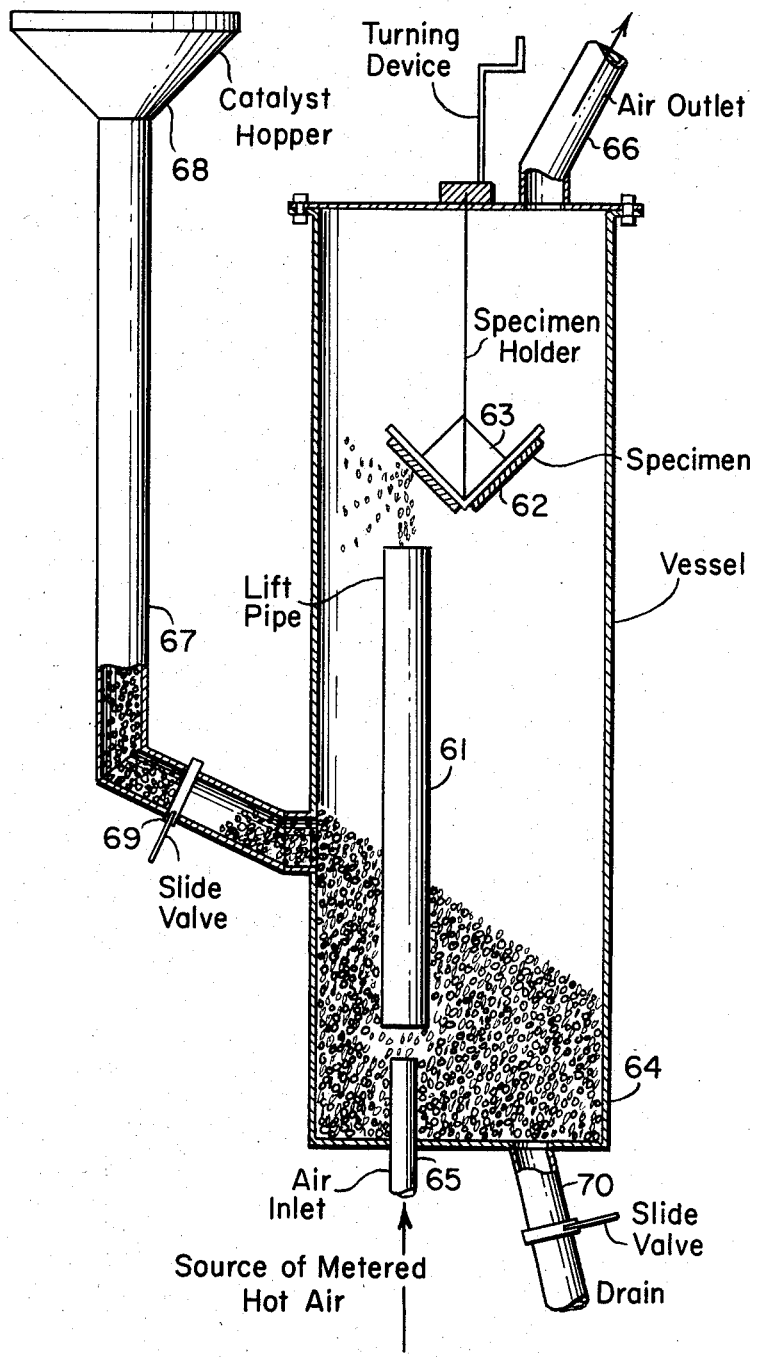
Figure 4 is a highly diagrammatic representation of test apparatus for testing materials for use as lift pipe lining materials.

Referring to Figure 1, a typical cyclic system for the conversion of hydrocarbons is illustrated. A granular material is gravitated at high temperature downwardly as a compact mass from the separator 10, connecting conduit 11, reactor 12, connecting members 13, 13, kiln or regenerator 14, connecting members 15, 15 to the lift feed tank 16. Reactant hydrocarbons are introduced into the vessel 12 through the conduit 17 and converted products are withdrawn through the conduit 18. The reactants may be a gas oil or similar petroleum oil passed through the gravitating bed of hot catalyst to produce a product containing an increased amount of high quality motor fuel. As a by-product of the cracking or reforming reaction, a carbonaceous material or coke is formed on the catalyst, impairing its usefulness. Air is introduced into the kiln 14 through the conduit 19 to burn the coke on the catalyst and render it fit for re-use in the conversion process. Flue gas formed by the combustion, is removed from the kiln through the conduit 20. The kiln may be of annular cross-section as shown, in which case the lift pipe 20 is projected through the central opening or, alternatively, the kiln may be of rectangular or circular cross-section, in which case the lift pipe is located alongside the vessel.

A lift gas, such as air, is passed through the conduit 21 at a controlled rate to serve as a lifting medium. This gas may be split into a primary stream, passed through pipe 22, and a secondary stream, passed through pipe 23. The gas is mixed with the hot granular contact material in the lift tank 16 in the desired proportions and the mixture passed upwardly through the pipe 20 to the separator 10. The gas is withdrawn from the separator through the discharge pipe 24.

The details of the improved lift are shown more clearly on Figure 2. The lift pipe is formed of pipe sections 30, 31 and 32 welded together on their ends. It has been found desirable in these lifts to control the velocity of the gas passing through the lift by tapering the lift pipe outwardly from bottom to top. This can be done satisfactorily, as shown, by using pipe sections of gradually increasing diameter at successively higher levels. It is not necessary that each pipe section be larger than the one therebelow, but at least some of the sections at the higher levels will be larger in diameter than those below. The lining for the pipe is preferably centrifugally cast into the pipe sections prior to their assembly to form the assembled pipe.

It was expected that if a lift pipe could be made of wear-resistant alloy material, that the erosion caused by the rapidly flowing hot catalyst would be reduced and the difficulty, to some extent, removed. Because of the length of the lift pipe used to convey the catalyst in the TCC system and the fact that erosion-resistant alloys have little structural strength, there was presented a problem of building a continuous open-ended lift pipe which would be strong enough to support itself at high temperature without obstruction to the flow of catalyst in the pipe and yet, would also be made of a suitably selected wear-resistant alloy. This problem was solved by forming a lift pipe of sections of low carbon steel which could be welded together and locating within each section an inner surface of the suitably selected wear-resistant alloy. The outer steel carried the load and provided the support for the inner surface material and yet, this was done without obstructing, in any way, the flow of catalyst through the lift pipe. Earlier tests had shown that any structural member located within the lift pipe in the stream of rising catalyst and lift gas would be rapidly eroded by the catalyst and would cause an excessive amount of catalyst breakage. While it was expected that the use of wear-resistant alloys as an inner surface for the lift pipe would effectively reduce erosion of the metal, it was a distinct surprise during the test work to find that certain of the wear-resistant alloys tested showed unusual results in reduction of erosion in this particular service; i.e., the resistance to erosion from the impingement of hot granular catalyst in a lift pipe through which the catalyst is moving in a stream of rapidly flowing lift gas. It is important to note that this unusual result was found to exist even though the alloys selected for test were of approximately the same hardness number. It was discovered that some alloys possess unusual properties of high temperature erosion-resistance. The properties were noted to depend primarily upon the alloy content and the structures produced as a result of the analysis rather than the specific hardness. This discovery has been exceedingly useful in providing an improved lift pipe for use in the TCC process which effectively eliminates the troubles of the former lift pipe and is a major portion of this invention.

It is preferred that the liner be made of a high chromium iron alloy comprising 24–30 percent chromium, 2.25–2.85 percent carbon, .50–1.25 percent manganese, .25–1.00 percent silicon, nickel less than 2 percent, and the remainder substantially all iron. It has been found that this alloy has particularly high resistance to wear caused by the impingement of hot catalyst against the metal at high velocity.

Suitable apparatus for determining the wear resistance of this metal and other metals is shown diagrammatically on Figure 4. This apparatus was designed for determining in terms of a wear number the resistance of a metal to erosion by abrasive particles and particularly abrasive granular catalyst particles carried by an air stream. The apparatus was developed particularly for evaluating the erosion-resistance of various hard-faced surface materials for possible use in dual metal lift pipe linings for TCC units and similar equipment employing air lift devices. The wear number is defined as the ratio of the wear of low carbon steel to the wear of the metal in question when the two are exposed to the same erosive conditions for the same length of time.

DESCRIPTION OF TEST APPARATUS

The apparatus consists of a vertical pipe 61 into which abrasive particles (silica-alumina catalyst beads) can be introduced at the bottom, propelled through the pipe by an air stream, and allowed to impinge on the surface of a metal specimen 62 mounted above the pipe. The specimens 62 are mounted on a movable specimen holder 63. The pipe and specimen holder are enclosed in a vessel 64, which is provided with an inlet 65 for lift air, an outlet 66 for used lift air, and a conduit 67 through which beads are introduced into the vessel 64 from the hopper 68. The slide valve 69 is provided to interrupt the flow of beads to the apparatus. The vessel 64 is provided with a heated and insulated jacket for maintaining temperature.

A satisfactory test apparatus employed to determine wear numbers of various possible metals and alloys has a vessel 64 made from a 2-foot length of 8-inch diameter steel pipe. It is wrapped with an electric heating coil and insulated with magnesia pipe insulation. The air inlet pipe extends through the bottom and is welded in place. A catalyst drain pipe 70 is also welded to the bottom. A slide valve 71 is provided in the drain pipe 70. Catalyst beads are fed through the pipe 67 into the vessel 64, when test operations are progressing, in sufficient quantity to insure that the bottom of the lift pipe is always below the catalyst level. The attachment of pipe 67 to the vessel 64 must, therefore, be located high enough with respect to the bottom of the vessel to assure that an adequate amount of catalyst enters the vessel.

The lift pipe 61 is made from a piece of 1-inch, schedule 80 stainless steel pipe, 12 inches in length. The bottom of the pipe has an internal taper made by reaming the pipe with a pipe reamer to a $\frac{1}{16}$-inch wall thickness at the end. The pipe is mounted vertically and centered exactly over the air inlet pipe. The vertical distance from the bottom of the lift pipe to the top of the air inlet is 0.75 inch. The pipe is subject to wear and requires frequent replacement. It is, therefore, mounted in such a way that it can be easily removed. The mounting must be arranged so as not to interfere with the flow of catalyst to the bottom of the pipe, and the pipe must be mounted far enough from the vessel wall to assure free catalyst flow around it.

The specimen holder should provide for at least two specimens because a low carbon steel specimen is always exposed concurrently with the metal being tested. The specimen is constructed so that the two specimens may be exposed alternately to the catalyst stream. The specimens are preferably supported at an angle of 45 degrees to the centerline of the lift pipe. The center of the specimen is preferably located directly over the center of the lift pipe and 2.0 inches from the top of the lift pipe.

A compressed air source is used to elevate the catalyst and a means of measuring the air flow provided. A heater is used to heat the air before it enters the test vessel. A suitable air source has been found to be a 300 s.c.f.m. compressor.

The abrasive particles used in the test are silica-alumina catalyst beads of such sizes as to pass a 4 mesh Standard Tyler sieve and be retained on 8 mesh Standard Tyler sieve (average particle diameter .13 to .14 inch).

TEST SPECIMENS

The specimens of low carbon steel and of the metal under test are made in rectangular shape 4 inches long, 1 inch wide, and ¼ inch thick. They are drilled at the ends and bolted to the specimen holder. Specimens which might oxidize during the test are chromium plated. The plating, however, is ground off the side exposed to the catalyst stream. The specimens are mounted to expose one of the 1-inch by 4-inch faces. The standard specimens are made of AISI 1010 to 1020 steel with chromium plating on all sides except the surface exposed to the catalyst stream.

TEST PROCEDURE

The test specimens are weighed before mounting on the specimen holder. After inserting the specimen in the unit, the air flow is adjusted to 23 s.c.f.m. The heaters are adjusted to give an operating temperature of 1050° F. When the proper temperature is reached, the test is begun by opening the hopper slide valve 69 to allow catalyst to flow into the vessel. The catalyst is lifted in the air stream and the test specimen and low carbon steel standard specimen are exposed alternately for two hour periods to the flow of catalyst. The specimens are exposed for the same total time, normally 16 to 18 hours. At the end of the test, the specimens are removed and weighed. The wear number of the test specimen is calculated by dividing the weight of metal lost by the low carbon steel standard by the weight of metal lost by the test specimen.

A series of selected alloys of high hardness number were tested and gave the results shown in Table I.

*Table I*

| Specimen | Rockwell Hardness No. | Wear Numbers |
|---|---|---|
| A | 52C | 3.0 |
| B | 56C | 3.1 |
| C | 45C | 3.4 |
| D | 54C | 3.5 |
| E | 58C | 3.5 |
| F | 60C | 3.6 |
| G | 65C | 3.6 |
| H | 63C | 3.9 |
| I | 56C | 4.1 |
| J | 40C | 4.3 |
| K | 48C | 4.4 |
| L | 40C | 4.4 |
| M | 63C | 4.5 |

One alloy was tested which showed good results in the wear test unit. An alloy comprising about 4.6% carbon, 32% chromium, 1.25% manganese, .50% silicon, and substantially all of the remainder iron. This alloy, although it showed a 50C Rockwell Hardness when tested, produced a wear number of 10.1. An outstanding alloy with respect to resistance of erosion of hot catalyst impingement was found to be an alloy of about 24 to 30% chromium, 2.25 to 2.85% carbon, and the rest substantially all iron. This alloy provided a wear number of approximately 21. This alloy has been used commercially and found to operate successfully for extended periods of time in commercial lift pipes approximately 240 feet tall, and has produced a substantial improvement over the pipes formerly used. It has been found, however, that with continued use there is an appreciable softening of the metal which causes a potential reduction in the wear-resistance number of the metal. This softening may be substantially minimized by the addition of small amounts of molybdenum and vanadium in the analysis. Tested comparatively, the following results were obtained:

*Table II*

| Metallic Alloy | Brinell Hardness No. After 2,078 Hours at 1,000° F. |
|---|---|
| 24-30% Chromium<br>2.25-2.85% Carbon<br>.50-1.25% Manganese<br>.25-1.00% Silicon<br>Less than 2% Nickel<br>The remainder substantially all iron. | 439 |
| 24-30% Chromium<br>2.25-2.85% Carbon<br>1.21% Molybdenum<br>.44% Vanadium<br>.50-1.25% Manganese<br>.25-1.00% Silicon<br>Less than 2% Nickel<br>The remainder substantially all iron. | 461 |
| 24-30% Chromium<br>2.25-2.85% Carbon<br>2.21% Molybdenum<br>.64% Vanadium<br>.50-1.25% Manganese<br>.25-1.00% Silicon<br>Less than 2% Nickel<br>The remainder substantially all iron. | 501 |

The alloys tested above had a Brinnell hardness number of 500 at the commencement of the above-indicated test. It is therefore recommended that in order to minimize softening about 1 to 2 percent molybdenum, and about .4 to .75 percent vanadium be added to the analysis.

The ends of the liner are made flat, so that when the pipe sections are welded together to form the sheath, the liner ends are butted together, forming a substantially continuous lining. The weight load of the lift pipe is transferred from the upper levels down, primarily through the welds between pipe sections 30, 31 and 32. Substantially the entire weight of the pipe is carried by the pipe support ring 36, which is welded to the lowermost section of the pipe. This ring 36 is welded to the top of the lift feed tank 16, thereby transmitting the load to the walls of the tank 16. The tank is supported on concrete piers 37, attached to the ground 38. This arrangement provides substantially free pipe expansion and contraction, preventing stresses from being set up in the pipe as a result of the large change of temperature of the pipe from atmospheric to operating temperatures of 1000° F., or more.

In the lift tank design illustrated on Figure 2, the primary gas pipe is projected upwardly into the bottom of the tank. The secondary gas pipe 23 communicates with an annular region enclosed by the baffle 39. A mouthpiece 40 is located at the bottom of the lift pipe and connected to the pipe by means of bolts 41 passed through a flange 42 on the mouthpiece and the pipe support ring 36. The pipe 37 is terminated just below or even within the mouthpiece 40, so that the primary gas enters the lift pipe directly. The conduits 15, 15 are located so that catalyst feeds about the ring baffle 39. Therefore, the secondary gas passes through the bed of catalyst, pushing the material into the primary gas stream to be transported through the lift pipe. The baffle 43 in the separator 10 helps to direct the gas and catalyst toward the bed in the lower portion of the separator.

Referring now to Figure 3, a detail of the pipe is shown which illustrates the weld between pipe sections. The ends of the pipe sections 30 and 31 are beveled to form a V-shaped groove when the sections are placed end to end. The pipe sections are welded circumferentially at their ends by filling the V-shaped groove with a suitable welding material. The figure illustrates that the ends of the liners 33, 34 are flat and butted together, without being welded.

This application is a continuation-in-part of application Serial No. 348,798, filed April 14, 1953, now abandoned.

The invention is not intended to be limited to the precise structure shown or described hereinabove, but is broad to modifications of the example shown to illustrate the invention which do not constitute departure from the invention.

We claim:

1. In a cyclic system for the conversion of hydrocarbons in the presence of a moving particle-form hot contact material, in which the contact material is gravitated in substantially compact columnar form through reaction and regeneration zones and is elevated pneumatically through an upwardly-directed lift pipe from a region below one of the zones to a region above the other of said zones, the improvement which comprises: a substantially vertical lift pipe comprising a sheath formed by pipe sections of a carbon or low alloy steel having high tensile strength and adapted for strong welds, the sections are beveled at their ends to form a substantially V-shaped notch when placed end to end and said sections are welded circumferentially at their ends, a liner cast to the inner surface of each of said pipe sections, which liner is a high chromium iron alloy comprising 24–30 percent chromium, 2.25–2.85 percent carbon, .50–1.25 percent manganese, .25–1.00 percent silicon, less than 2 percent nickel, and the rest substantially all iron, the ends of the liners being flat and butted together in the assembled lift pipe, the pipe sections being of progressively larger diameters at successively higher levels, a lift feed tank attached to the lowermost pipe section, so as to support substantially the entire weight of the lift pipe.

2. In a pneumatic lift for the elevation of hot contact material, the improvement comprising: a substantially vertical lift pipe comprising a sheath formed by pipe sections of a carbon or low alloy steel having high tensile strength and adapted for strong welds, which sections are welded together on their ends to form a continuous pipe, a liner cast to the inner surface of said pipe sections, which liner is a high chromium iron alloy comprising 24–30 percent chromium, 2.25–2.85 percent carbon, .50–1.25 percent manganese, .25–1.00 percent silicon, less than 2 percent nickel, and the remainder iron, the pipe sections being beveled at their ends to produce notches when placed end to end, and welded circumferentially at their ends, the liner ends being flat and butted together, without being welded at their ends, and a lift tank attached about the lower end of the lift pipe, said tank being connected to the sheath of the lift pipe, to provide support for the lift pipe.

3. In a pneumatic lift for the elevation of hot contact material, the improvement comprising: a substantially vertical lift pipe comprising a sheath formed by pipe sections of a carbon or low alloy steel having high tensile strength and adapted for strong welds, which sections are welded together on their ends to form a continuous pipe, a liner cast to the inner surface of said pipe sections, which liner is a high chromium iron alloy comprising 24–30 percent chromium, 2.25–2.85 percent carbon, .50–1.25 percent manganese, .25 to 1.00 percent silicon, less than 2 percent nickel, and the remainder iron, the pipe sections being of progressively larger diameter at successively higher levels and a lift feed tank attached about the lower end of the lift pipe with the lift feed tank connected to the sheath of the lift pipe, so as to support at least substantially the entire weight of the lift pipe.

4. In a cyclic system for the conversion of hydrocarbons in the presence of a moving particle-form hot contact material, the improved apparatus for pneumatic transfer of the contact material comprising: a substantially vertical lift pipe comprising a sheath formed by pipe sections of a carbon or low alloy steel having high tensile strength and adapted for strong welds, which sections are welded together on their ends to form a continuous pipe, a liner on the inner surface of a substantial number of said pipe sections, which liner is a high chromium iron alloy comprising 24–30 percent chromium, 2.25–2.85 percent carbon, .50–1.25 percent manganese, .25–1.00 percent silicon, less than 2 percent nickel, and the remainder iron, means to admit contact material and lift gas at the lower end of said lift pipe and means to receive and separate gas from solids communicating with the upper end of said lift pipe.

5. Claim 4 further characterized in that the Brinell hardness of the high chromium alloy is at least about 500 Brinell hardness number.

6. In a cyclic system for the conversion of hydrocarbons in the presence of a moving particle-form hot contact material, the improved apparatus for pneumatic transfer of the contact material comprising: a substantially vertical lift pipe comprising a sheath formed by pipe sections of a carbon or low alloy steel having high tensile strength and adapted for strong welds, which sections are welded together on their ends to form a continuous pipe, a liner on the inner surface of a substantial number of said pipe sections, which liner is a high chromium iron alloy comprising about 24–30 percent chromium, 2.25–2.85 percent carbon, .50–1.25 percent manganese, .25–1.00 percent silicon, less than 2 percent nickel, 1–2 percent molybdenum, 0.40–0.75 percent vanadium and the remainder substantially all iron, means to admit contact material and lift gas at the lower end of said lift pipe and means to receive and separate gas from solids communicating with the upper end of said lift pipe.

7. In a pneumatic lift for the elevation of hot contact material, the improvement comprising: a substantially vertical lift pipe comprising a sheath formed by pipe sections of a carbon steel having high tensile strength and adapted for strong welds, which sections are welded together on their ends to form a continuous pipe, a liner cast to the inner surface of said pipe sections, which liner is a high chromium iron alloy comprising 24 to 30 percent chromium, 2.25 to 2.85 percent carbon, .50 to 1.25 percent manganese, .25 to 1.00 percent silicon, less than 2 percent nickel, and the remainder substantially all iron, the pipe sections being beveled at their ends to produce notches when placed end to end, and welded circumferentially at their ends, the liner ends being flat and butted together, without being welded at their ends, and a lift tank attached about the lower end of the lift pipe, said tank being connected to the sheath of the lift pipe, to provide support for the lift pipe.

8. In a pneumatic lift for the elevation of hot contact material, the improvement comprising: a substantially vertical lift pipe comprising a sheath formed by pipe sections of a carbon steel having high tensile strength and adapted for strong welds, which sections are welded together on their ends to form a continuous pipe, a liner cast to the inner surface of said pipe sections, which liner is a high chromium iron alloy comprising 24 to 30 percent chromium, 2.25 to 2.85 percent carbon, .50 to 1.25 percent manganese, .25 to 1.00 percent silicon, less than 2 percent nickel and the remainder substantially all iron, the pipe sections being of progressively larger diameter at successively higher levels, and a lift feed tank attached about the lower end of the lift pipe with the lift feed tank connected to the sheath of the lift pipe, so as to support at least substantially the entire weight of the lift pipe.

References Cited in the file of this patent

UNITED STATES PATENTS

| | | |
|---|---|---|
| 2,258,564 | Armstrong | Oct. 7, 1941 |
| 2,308,307 | Robinson | Jan. 12, 1943 |
| 2,684,872 | Berg | July 27, 1954 |
| 2,723,180 | Celani | Nov. 8, 1955 |
| 2,765,265 | Bourguet | Oct. 2, 1956 |
| 2,770,504 | Bourguet | Nov. 13, 1956 |

OTHER REFERENCES

Publication, High Chromium Alloys, by Kinzel and Franks, published by McGraw-Hill Book Co., chaper VIII, pages 228–260.